Jan. 11, 1955
P. E. SELF
2,699,273
CABBAGE SEED DROPPER
Filed Oct. 2, 1951
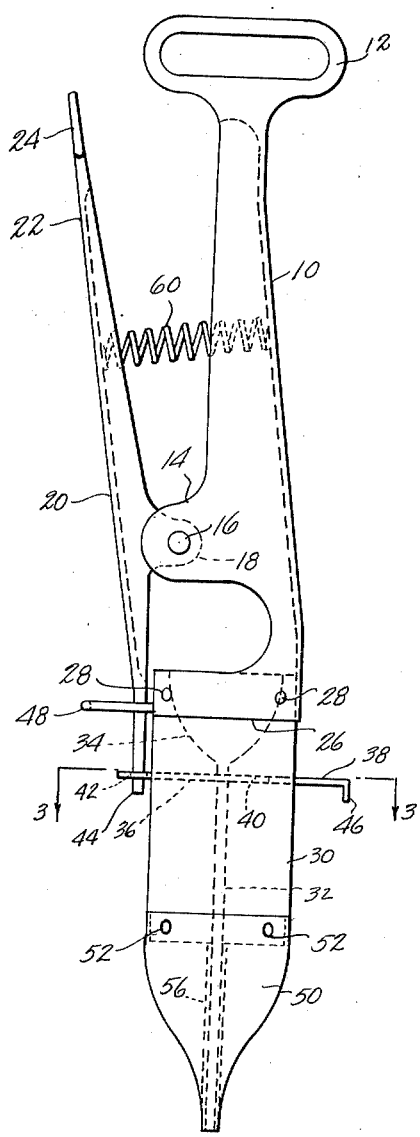
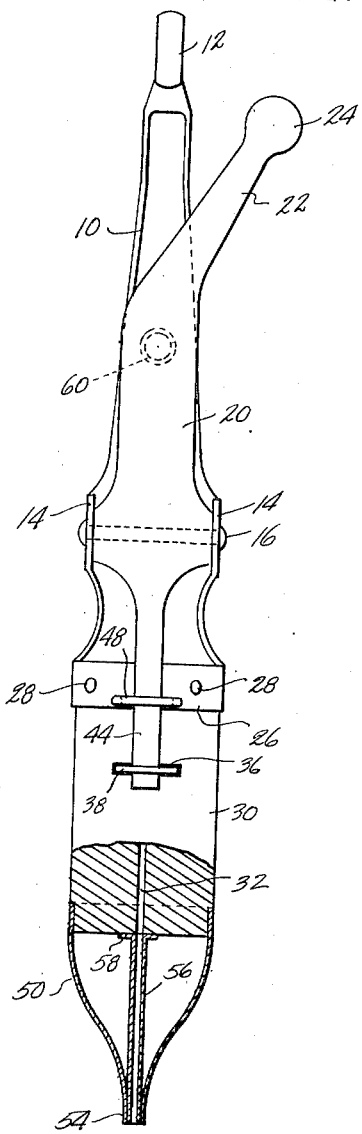
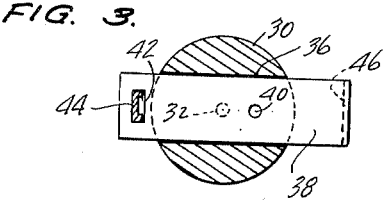
INVENTOR
PLATO E. SELF,
BY
McMorrow, Berman & Davidson
ATTORNEYS

United States Patent Office 2,699,273
Patented Jan. 11, 1955

2,699,273
CABBAGE SEED DROPPER
Plato E. Self, Little Switzerland, N. C.

Application October 2, 1951, Serial No. 249,325

1 Claim. (Cl. 222—459)

This invention relates to seed planting devices, and more particularly, has reference to a hand operated cabbage seed planter.

It is an important object of the present invention to provide a planter or seed dropper as stated so formed as to be manually operated with considerable speed and ease.

Another important object is to provide a seed dropper of the type stated which can be manufactured at relatively low cost, but which will at the same time be capable of efficient and accurate operation at all times, will be rugged, and will be composed of a minimum of parts simply arranged in a manner whereby they will not readily get out of order.

Yet another important object is to provide a device of the character stated which, on manual urging of a pair of pivotally connected handles toward one another, will be effective to drop a specified number of seeds.

Other objects will appear from the following description, the claim appended thereto, and from the annexed drawing, in which like reference characters designate like parts throughout the several views, and wherein:

Figure 1 is a side elevational view of a seed dropper formed in accordance with the present invention;

Figure 2 is an elevational view taken from the left of Figure 1, the lower portion of the dropper being shown in longitudinal section; and Figure 3 is a transverse sectional view taken on line 3—3 of Figure 1.

Referring to the drawings in detail, the invention includes a channeled metal handle 10 having at one end a transversely disposed finger grip 12, that is rigidly secured to the handle 10 in any suitable manner.

Contiguous to its inner end, the channeled fixed handle 10 is formed with laterally extended, spaced ears 14 having transversely aligned openings receiving a hinge pin 16, that also passes through ears 18 embraced by the ears 14, and formed integrally upon a movable handle 20. The handle 20 is also preferably formed of channeled metal material, and has an obliquely offset free end portion 22 formed with a thumb-receiving disc 24.

At its inner end, the fixed handle 10 is formed with a short sleeve 26, through which screws or equivalent fastening elements 28 extend, the sleeve receiving the upper end of a cylindrical body 30, that is fixedly connected to the sleeve through the medium of the fastening elements 28. The sleeve 26 and body 30 comprising a seed-receiving and dispensing member.

The body 30 is provided with an axially disposed bore 32, one end of which opens upon the lower end of the body, the other end opening into communication with the smaller end of a tapered cavity 34 formed in the upper end of the body. The cavity 34 is of a constant diameter equal to the diameter of the cavity at said smaller end thereof, and is adapted to receive a supply of cabbage seeds or the like, not shown, for gravitation of said seeds through the bore 32.

Intermediate its opposite ends, the body 30 is formed with a transverse, relatively wide slot 36, opening through the side wall of the body at diametrically opposite locations upon the body, and slidably mounted in the slot 36, for reciprocation transversely of the body, is a flat slide 38, that projects beyond opposite ends of the slot 36.

One projecting end of the slide 38 is formed with a transverse slot-like aperture 42, receiving a tongue 44 formed integrally upon the movable handle 20 at the inner end thereof, and extending longitudinally of the fixed handle 10 and the body 30. The other projecting end of the slide is integrally formed with a depending lip 46, that serves to limit movement of the slide in one direction, that is, toward the left in Figure 1.

Preferably, a staple 48, that comprises a stop member limiting outward movement of the tongue 44, is secured to the sleeve 26 and body 30, in spaced relation to the slide 38, said staple bridging the tongue 44.

A tapered, hollow seed dispensing cap 50 is secured fixedly to the lower end of the body 30 through the medium of screws or equivalent fastening elements 52, said cap being formed at its small end with an opening 54 in which is engaged the outer end of an extension tube 56 having an annular flange 58 on its inner end engaging the lower end of the body 30. The tube 56 is aligned coaxially with the bore 32.

A spring 60 is interposed between the fixed and movable handles, above the pivotal connection 16, and normally biases the movable handle 20 away from the fixed handle.

It is believed that the operation of the seed dropper will be clear from the description which has been provided, but it may be worthy of note that in use of the device, it is merely necessary that the fixed and movable handles be gripped, after a supply of cabbage seeds or the like has been placed in the cavity 34. Thereafter, at the locations at which the seeds are to be dropped, the user presses the handles together, causing the slide 38 to be shifted to the left in Figure 1. In this connection, the slide 38 has a small opening 40 which in the normal, spread position of the handles is offset from the bore 32, thus to cause the bore to be closed and thereby prevent passage of seeds therethrough.

When, however, the handles are pressed together in the manner noted above, the opening or port 40 is brought into registration with the bore 32, permitting four or five cabbage seeds to drop out of the tube 56 each time the fixed and movable handles are pressed together and instantaneously released.

It is seen from the above that the device formed in accordance with the present invention is of very simple construction, compact and light in weight. It is further believed to be an important characteristic of the invention that the seed planter is so formed as to drop a predetermined quantity of seeds, by the normal action of pressing the handles together and immediately releasing them.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims. For example, a rubber band could be extended around the body 30 and engaged with the tongue 44 of the movable handle. This might well be used as a substitute for the spring 60, or alternatively, could be additive to the action of the spring.

What is claimed is:

A hand supported and actuated seed dropper comprising a body having a seed storage cavity in its upper end and a tapered seed dispensing cap on its lower end, said body having a central bore therethrough connecting said seed storage cavity and terminating at the lower end of said cap, a fixed handle on the upper end of said body, a movable handle pivotally supported intermediate the ends of said fixed handle, said body having a transverse slot through it traversing said bore, an apertured slide in said slot movable to selectively align the aperture therein with said bore, means connecting said slide with said movable handle, and resilient means for normally holding said slide in non-dispensing position.

References Cited in the file of this patent

UNITED STATES PATENTS

| Number | Name | Date |
|---|---|---|
| 94,910 | Pelham | Sept. 14, 1869 |
| 345,198 | Wesson | July 6, 1886 |
| 468,346 | Johnson | Feb. 9, 1892 |
| 1,277,999 | Nordin | Sept. 3, 1918 |
| 1,524,662 | Layman | Feb. 3, 1925 |
| 2,453,974 | Colaluca | Nov. 16, 1948 |
| 2,535,726 | Dalton | Dec. 26, 1950 |

FOREIGN PATENTS

| 11,290 | Great Britain | July 3, 1891 |